United States Patent
Tabarovsky et al.

(12)

(10) Patent No.: US 6,353,322 B1
(45) Date of Patent: Mar. 5, 2002

(54) METHOD FOR AUTOMATICALLY CALIBRATING RESISTIVITY WELL LOGS FOR EFFECTS OF CHANGE IN WELLBORE DIAMETER AND CIRCUIT DRIFT

(75) Inventors: Leonty Abraham Tabarovsky; Gregory Boris Itskovich, both of Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/094,220

(22) Filed: Jun. 9, 1998

(51) Int. Cl.$^7$ .............................. G01V 3/20; G01V 3/26
(52) U.S. Cl. ........................ 324/366; 324/358; 324/371
(58) Field of Search ................................ 324/358, 366, 324/367, 370, 368

(56) References Cited

U.S. PATENT DOCUMENTS 4,796,186 A * 1/1989 Kaufman ..................... 364/422
5,563,514 A * 10/1996 Moulin ......................... 324/368

OTHER PUBLICATIONS

Stable Iterative Methods for the Inversion of Geophysical Data; D. L. B. Jupp and K. Vozoff; *Geophys. J. R. astr. Soc.* (1975) vol. 42, pp. 957–956.

Philip Keary and Michael Brooks, An Introduction to Geophysical Exploration, (Oxford, U.K.: Blackwell Scientific Publications, 1991), 177–82, 1991.*

* cited by examiner

*Primary Examiner*—Christine K. Oda
*Assistant Examiner*—Henry S. Andersen
(74) *Attorney, Agent, or Firm*—Darryl M. Springs

(57) ABSTRACT

A method for determining the resistivity of earth formations penetrated by a wellbore. Electrical current is imparted to the wellbore and the earth formations from a first electrode located on a mandrel disposed in the wellbore. The electrical current is returned at a second electrode on the mandrel at a spaced apart location from the first electrode. Voltage differences are measured between a first pair and a second pair of electrodes located on the mandrel between the first and the second electrodes. Circuits used to measure the voltage differences are adjusted until the measured voltage difference between the second pair is substantially the same as the measured voltage difference between the first pair. Then the electrical current is returned to an electrode at the earth's surface or other location distal from the first electrode, and measuring the voltage differences is repeated. A difference of the voltage differences is then calculated. The difference of voltage difference represents current leakage into the earth formation substantially unaffected by irregularities in the wall of the wellbore or drift in the circuits. The current leakage is inversely related to the resistivity of the earth formations.

10 Claims, 3 Drawing Sheets

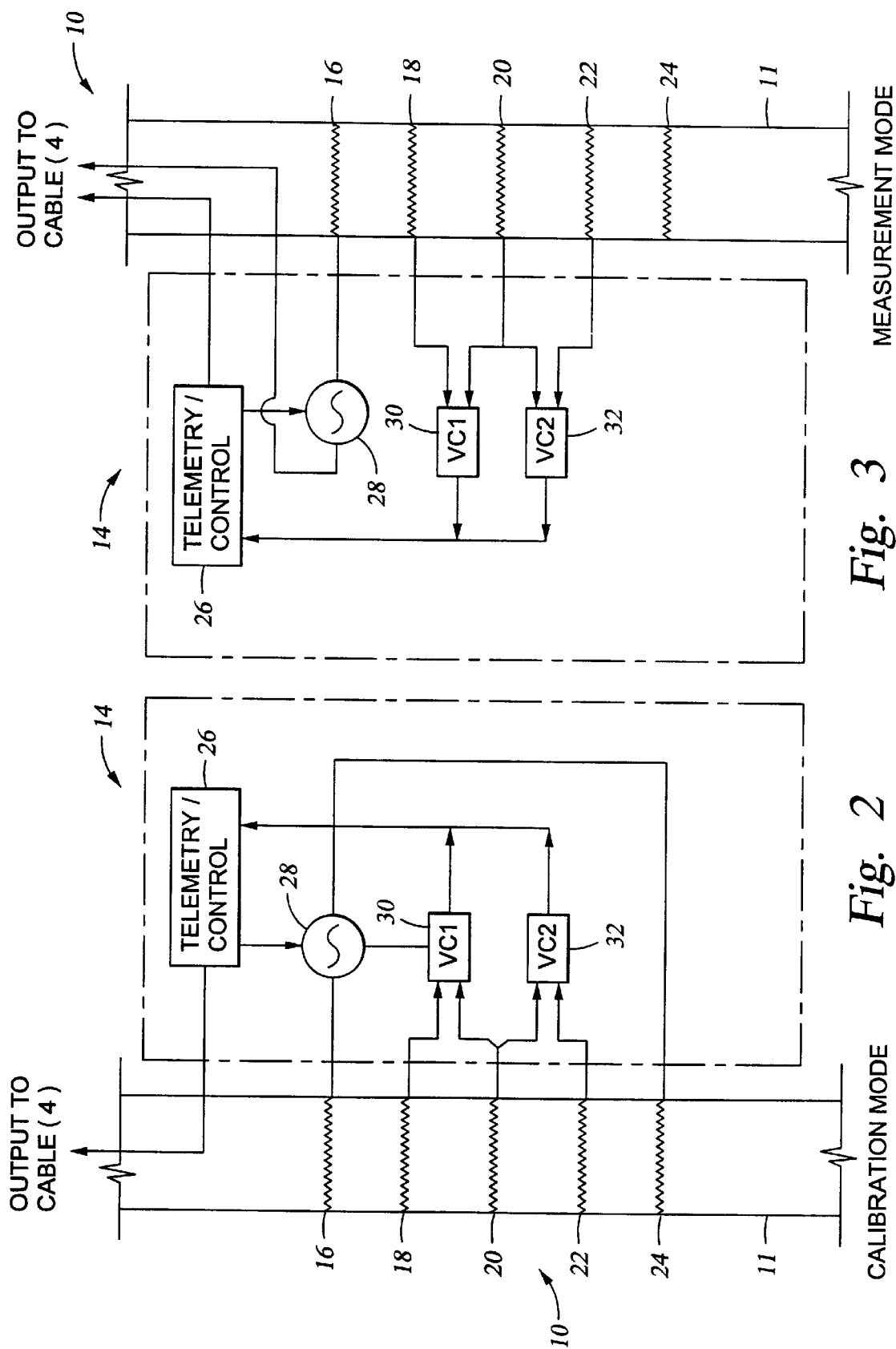

METHOD FOR AUTOMATICALLY CALIBRATING RESISTIVITY WELL LOGS FOR EFFECTS OF CHANGE IN WELLBORE DIAMETER AND CIRCUIT DRIFT

BACKGROUND OF THE INVENTION

1. Field of the Invention

The invention is related to the field of electrical resistivity logging of oil and gas wells. More specifically, the invention is related to methods for improving the response of resistivity logs by correcting measurements for the effects of irregularities in the wall surface of the wellbore, and for drift in measuring circuits in the well logging instrument.

2. Description of the Related Art

Electrical resistivity well logging is used to determine the electrical resistivity of earth formations from within a wellbore drilled through the earth formations. Electrical resistivity well logging instruments and methods known in the art include so-called "galvanic" resistivity instruments which impart electrical current to the earth formation in a predetermined flow pattern and measure voltage drop of the electrical current and the current magnitude to determine the resistivity of the earth formations. At any particular magnitude of current, the voltage drop is related to the resistivity of the formations surrounding the wellbore.

One type of galvanic resistivity instrument is the laterolog. The laterolog instrument uses focusing currents to constrain the path of the current used to measure voltage drop. By constraining the path of the measure current, the voltage drop in the measuring current can be more directly related to particular layers of the earth formations adjacent to the wellbore and the logging instrument. An example of a laterolog instrument is described in U.S. Pat. No. 5,585,727 issued to Fanini et al. Laterolog instruments work best where the resistivity of fluid in the wellbore is very low.

Another type of galvanic resistivity well logging instrument intended to overcome certain limitations of laterolog instruments is known as a "multiple electrode resistivity tool". A service using this type of galvanic well logging instrument is sold under the trade name "HDLL" by the assignee of this invention. See G. Itskovich et al, *High-Definition Lateral Log Resistivity Device: Basic Physics and Resolution*, 39th Annual Symposium, Society of Professional Well Log Analysts (1998). The multiple electrode resistivity tool includes a measuring current source connected to an electrode on an insulating sonde mandrel and a series of voltage measurement electrodes located at spaced apart positions from the source-connected electrode along the insulating mandrel. Electrical current is emitted into the wellbore from the source-connected electrode, is returned at the earth's surface, or other physically distant location, and the voltage is measured at each of the measuring electrodes. Difference in potential is also measured between pairs of adjacent ones of the measuring electrodes. The voltage measured at each one of the electrodes, and the potential differences measured between the pairs of adjacent electrodes are used to determine the resistivity of the earth formations in both the uninvaded and invaded zones as well as the radial extent of the invaded zone by a process known in the art as "inversion". This process is described in the Itskovich et al reference, supra.

A limitation to the multiple electrode resistivity tool is that the voltage difference measurements can be subject to substantial error if the wall of the wellbore is irregular, particularly when the earth formation resistivity is very large relative to the resistivity of the fluid in the wellbore. If the wall of the wellbore is irregular, the measuring current path can become distorted and the relationship between voltage difference and earth formation resistivity can be changed as a result.

Another method for determining the resistivity of earth formations is to cause electrical current to flow mainly along the wellbore and to determine the amount of the current which "leaks" laterally away from the wellbore into the earth formation. The amount of current leakage is related to the conductivity (inverse of resistivity) of the earth formation. This principle has been used to determine the resistivity of earth formations from inside a conductive steel pipe or "casing". See U.S. Pat. No. 4,748,415 issued to Vail, for example. The theory of this measurement can be explained as follows. Consider, for example, a "current tube" in a wellbore having an axial dimension $\Delta$ along the wellbore wall adjacent to an earth formation interval of interest. The amount of lateral current leakage $I_r$ into the earth formations is equal to the difference in current between the upper and lower axial limits of the formation interval of interest, this difference represented by the expression:

$$I_r = I_z^- - I_z^+ \tag{1}$$

where $I_z^-$ and $I_z^+$ represent, respectively, the current flowing axially at the lower and upper limits of the earth formation interval of interest. The difference in currents may be expressed by a second difference of potentials, by an expression such as:

$$I_z^- - I_z^+ = \frac{\pi b^2}{R_m} \frac{\partial^2 V}{\partial z^2} \Delta \tag{2}$$

In equation (2), $R_m$ represents the resistivity of fluid ("drilling mud") in the wellbore and b represents the radius of the wellbore. The amount of current leakage is directly proportional to the voltage V at the wellbore wall, the inverse resistance of the current tube per unit length, $G_t$, and the axial dimension $\Delta$. This can be expressed as:

$$I_r = V \times G_t \times \Delta \tag{3}$$

The inverse resistance of the current tube per unit length, $G_t$ has physical dimension of $(ohm-m)^{-1}$. By combining equations (1) and (3), a well known "transmission line" equation can be obtained for the potential V:

$$\frac{\partial^2 V}{\partial z^2} = \alpha^2 V \tag{4}$$

$$\alpha^2 = \frac{R_m G_t}{\pi b^2}$$

The second potential derivative directly follows the formation resistivity, reflected in factor $G_t$. This principle has been used, as described in the Vail '415 patent, for determining resistivity of an earth formation from inside a conductive steel casing. The principle is particularly applicable to measurement of formation resistivity from inside a conductive casing where the contrast in resistivity between the wellbore and earth formation is very high. Where the wellbore includes a conductive casing, this contrast can exceed a factor of $10^9$. It has not been determined that the principle described in the Vail '415 patent has any application where such a large resistivity contrast between the wellbore and formation does not exist, as in the case where the wellbore does not include a conductive steel casing.

SUMMARY OF THE INVENTION

The invention is a method for determining the resistivity of earth formations penetrated by a wellbore. Electrical current is imparted to the wellbore and to the earth formations from a first electrode which is located on an insulating sonde mandrel disposed in the wellbore. The electrical current is returned at a second electrode also disposed on the sonde mandrel, at an axially spaced apart location from the first electrode. Voltage differences are measured between a first pair and a second pair of electrodes located on the mandrel between the first and the second electrodes. Circuits which are used to measure the voltage differences between the pairs of electrodes are then adjusted, until the measured voltage difference between the second pair of electrodes is substantially the same as the measured voltage difference between the first pair of electrodes. Then the electrical current is imparted from the first electrode, and is returned to an electrode located at the earth's surface or other physically distant location. Measuring the voltage differences between the pairs of electrodes is repeated. A difference of the voltage differences is then determined. The difference of voltage difference is directly related to current leakage into the earth formation, and this current leakage determination is substantially unaffected by irregularities in the wall of the wellbore or drift in the circuits used to measure the voltage differences. The current leakage is directly related to the conductivity of the earth formations. The current leakage can be inverted to obtain resistivity of the earth formations.

BRIEF DESCRIPTION OF THE DRAWINGS

FIG. 2 shows a functional block diagram of the well logging instrument of FIG. 1 in its so-called "calibration" mode.

FIG. 3 shows a functional block diagram of the well logging instrument of FIG. 1 in its so-called "measurement" mode.

DESCRIPTION OF THE PREFERRED EMBODIMENT

Figure 1:
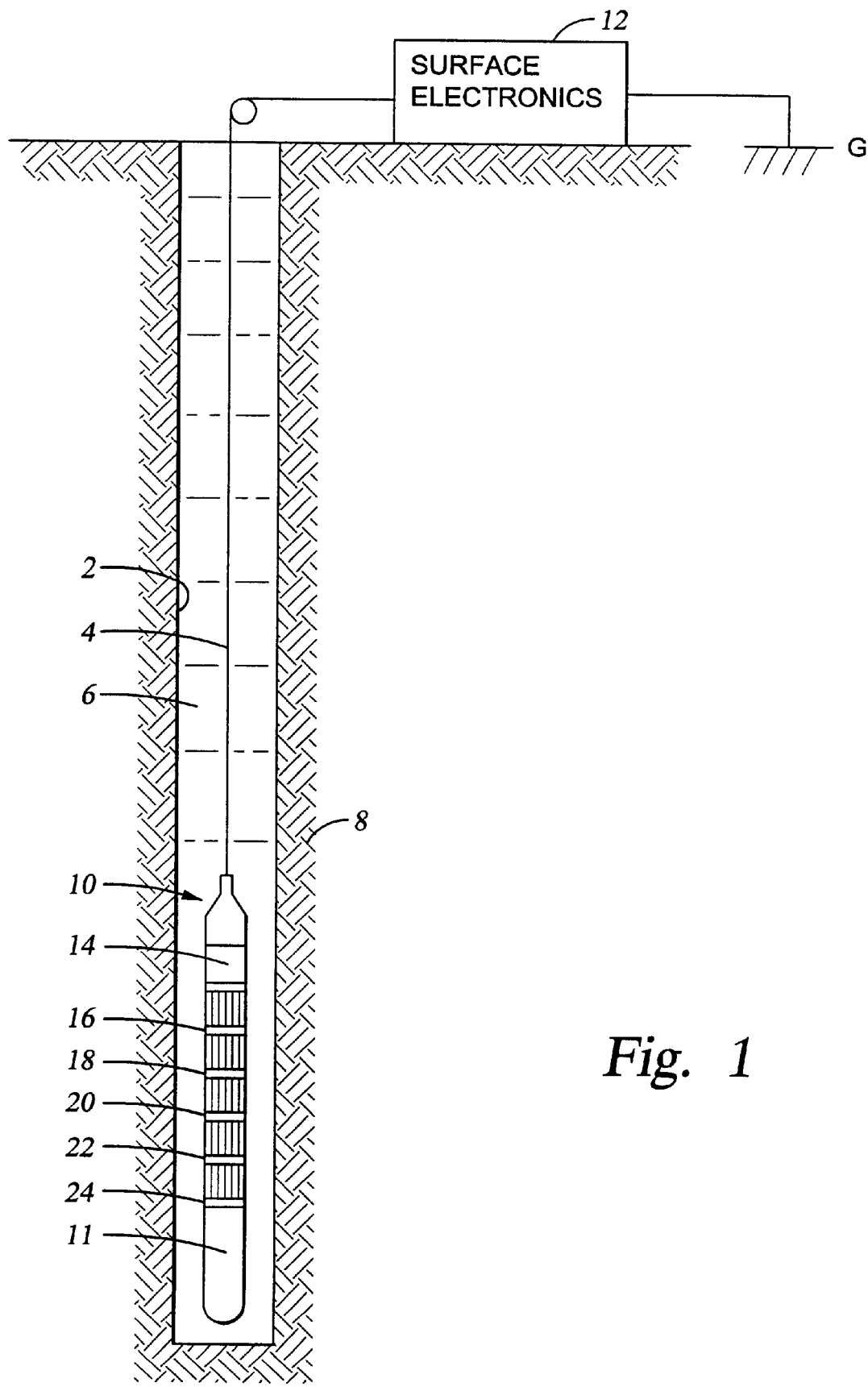
FIG. 1 shows a well logging instrument disposed in earth formations penetrated by a wellbore.

FIG. 1 shows an electrical resistivity well logging instrument 10 disposed in a wellbore 2 drilled through earth formations 8. The wellbore 2 is typically filled with an electrically conductive liquid 6, which can be a "drilling mud" having water as the continuous phase, or any similar fluid known in the art. The logging instrument 10 can be lowered into the wellbore 2 at one end of an armored electrical cable 4, which transmits electrical power to the instrument 10 and transmits signals from the instrument 10 to a surface electronics unit 12. The surface electronics unit 12 can include well known circuits (not shown separately) for supplying electrical power to the instrument 10 and for decoding and interpreting signals transmitted from the logging instrument 10. Also disposed at the earth's surface is a surface return electrode G, the purpose of which will be further explained.

The logging instrument 10 can include an electrically insulating sonde mandrel 11 on which are disposed electrodes, shown at 16, 18, 20, 22 and 24 at axially spaced apart locations along the mandrel 11. The electrodes can be connected individually to a telemetry/control unit 14, which can be disposed inside a part of the mandrel 11 designed to exclude the wellbore fluid 6. In this embodiment of the invention the electrodes 16, 18, 20, 22, 24 are preferably equally spaced from each other along the mandrel 11 to facilitate interpretation of the measurements of voltage drop made in the invention. However, it will become apparent to those skilled in the art that equal spacing is not absolutely necessary to the invention.

The electrical configurations of the logging instrument 10 are shown in FIGS. 2 and 3. FIG. 2 shows a functional block diagram of the instrument 10 when it is configured in a so-called "calibration" mode. The telemetry/control unit 26 connects a measure current source 28 between the outermost ones of the electrodes 16 and 24. The measure current source 28 can be a low-frequency, alternating current generator such as one described in U.S. Pat. No. 5,585,727 issued to Fanini et al, for example. Measuring current flows between the two outermost electrodes 16, 24 when the measure current source 28 is connected between them. A first voltage measuring circuit 30, which can be a digital circuit such as one described in the Fanini et al '727 patent, for example, can be interconnected between electrodes 18 and 20 to measure the voltage drop between those electrodes 18, 20. A second voltage measuring circuit 32, which can be similar in design to the first voltage measuring circuit 30, can be interconnected between electrodes 20 and 22 to measure the voltage drop between these electrodes 20, 22. The output signal from each of the voltage measuring circuits 30, 32 can be directed to the telemetry/controller unit 26 for encoding and transmission to the surface electronics (12 in FIG. 1) along the cable 4, for eventual decoding and interpretation in the surface electronics (12 in FIG. 1). Interpretation of the voltage drop measurements will be further explained.

FIG. 3 shows a functional block diagram of the logging instrument in a so-called "measurement" mode. In the measurement mode, the telemetry/controller unit 26 connects the measure current source 28 between one of the outermost electrodes, such as electrode 16, and the surface current return electrode (G in FIG. 1). The electrical connection between the measure current source 28 and the surface current return electrode G can be made using an insulated electrical conductor (not shown) in the cable 4, using techniques described in the Fanini et al '727 patent, for example. As electrical current flows between the outermost electrode 16 and the surface current return electrode G, voltage differences are again measured, between the same pairs of electrodes 18, 20 by the first circuit 30 and 20, 22 by the second circuit 32, as described for the calibration mode.

It is important to note that in the measurement mode, the locations of the current source electrode and the current return electrode are not important to the measurement. It is only necessary that the current source electrode be in the vicinity of the measuring electrodes, generally within several feet. Using the same current source electrode 16 for the measuring mode as for the calibration mode as shown in FIGS. 2 and 3 is a matter of convenience for the system designer and is not meant to limit the invention. The measuring current in the measuring mode may also be returned at a location other than the earth's surface (surface current return electrode G), as long as the return electrode is spaced a sufficient distance from the source electrode. This distance is generally referred to in the art as representing an "infinite potential". For example, it is known in the art to return measuring current on the steel armor on the exterior of the electrical cable (4 in FIG. 1) particularly where the cable armor is electrically isolated for a substantial axial distance from the logging instrument (10 in FIG. 1) using an externally insulated cable connector known as a "bridle" (not shown).

Having shown the modes by which the instrument acquires measurements of voltage difference, the principle of the invention will now be explained. In the calibration mode (FIG. 2), if the electrodes 16, 18, 20, 22, 24 are equally spaced apart, the measurements of voltage difference made by the first voltage measuring circuit 30 would be exactly the same as the voltage difference measured by the second voltage measuring circuit 32 if the responses of the voltage measuring circuits 30, 32 were identical, and if the wellbore (2 in FIG. 1) were completely smooth and the earth formation had no axial variations in resistivity approximately between the outermost electrodes 16, 24. In reality, the responses of the voltage measuring circuits 30, 32 are typically not identical, and the wellbore (2 in FIG. 1) may have irregularities along its wall surface ("rugosity") which change the shape of the current path within the liquid (6 in FIG. 1) in the vicinity of some of the electrodes.

In the method of the invention, the response of each voltage measuring circuit 30, 32 can be changed or adjusted so that the difference between the voltage measurements made by the first 30 and by the second 32 voltage measuring circuits is substantially equal to zero when the instrument is in the calibration mode. One way to change or adjust the responses would be to adjust the gain of a preamplifier (not shown in FIG. 2) forming part of each voltage measuring circuit 30, 32. The output of the second measuring circuit 32 could be inverted and added to the output of the first measuring circuit 30, and the preamplifier adjustment would stop when the summed outputs was substantially equal to zero. By this form of calibration, differences in response of the voltage measuring circuits 30, 32 can be removed from the measurement. Another method would be to numerically sample the output of each circuit 30, 32 while operating in the calibration mode and deem the values to represent substantially equal magnitudes of voltage drop. Voltage measuring circuits described in the Fanini et al '727 patent for example, are well suited for digital measurement of voltage differences because any difference in numerical values of voltage measurements generated by each circuit 30, 32 could be accounted for numerically, rather than by adjusting preamplifier gains. Differences in response caused by irregularities in the wall of the wellbore will also be canceled by the adjustment of the response of the voltage measuring circuits 30, 32 whether done in analog fashion or by deeming numerical values of digital measurement circuits to represent the same magnitude of voltage drop.

When the response of the voltage measuring circuits 30, 32 have been adjusted so that their differential response is substantially equal to zero (or the numerical equivalent), the instrument 10 can then be operated at the same axial position in the wellbore 2 using the "measuring" mode, where the current source 28 is connected between the surface electrode G (or any other distant electrode) and one of the outermost electrodes, such as electrode 16. The voltage differences are again measured by the first 30 and second 32 voltage measuring circuits.

A difference between the two voltage difference measurements can then be determined. If the analog method of inverting one circuit output and summing with the other circuit output is used, the sum will directly represent the difference of differences. If the numerical version is used, direct subtraction will perform the same function. The "difference of differences" between the voltage difference measurements made by the first 30 and by the second 32 voltage measuring circuits in the measuring mode, after having made the previously described adjustment for any differential circuit responses in the calibration mode, will then represent the current leakage between measuring electrodes 18, 20 and 20, 22. This current leakage will be substantially unaffected by irregularities in the wall of the wellbore or by variations in response of the voltage measuring circuits 30, 32. The current leakage is related to the formation resistivity, as will be further explained.

In practical use in the wellbore (2 in FIG. 1), the telemetry/controller unit 26 can be programmed to alternate between the calibration mode and the measuring mode at a sufficiently high rate to provide "calibrate" and "measure" voltage measurements which have been made at effectively the same axial position in the wellbore (2 in FIG. 1), even though the logging instrument (10 in FIG. 1) is moved along the wellbore at speeds typical for resistivity well logging instruments (about 3600 feet per hour). The "calibrate" and "measure" measurements can be used to generate a measurement of current leakage at each axial position along the wellbore.

As explained in the Background section herein, the current leakage at any axial position z in the wellbore is inversely related to the resistivity of the formation into which the current leaks. It has been determined that the measurement of current leakage can be used to determined formation resistivity in the absence of a conductive casing in the wellbore. The measurements of current leakage can be used in an inversion process such as described in, G. Itskovich et al, *High-Definition Lateral Log Resistivity Device: Basic Physics and Resolution,* 39th Annual Symposium, Society of Professional Well Log Analysts (1998) to determine the formation resistivity.

TEST RESULTS

The method of the invention was numerically simulated using earth formation resistivities and wellbore conditions as shown in TABLE 1. The condition simulated was a "washout", where the diameter of the wellbore increased from 8 inches to 10 inches over a 2 inch axial interval. The fluid in the wellbore had a resistivity of 0.01 ohm-m and the resistivity of the surrounding earth formations was 100 ohm-m.

TABLE 1

| Layer No. | Wellbore Diameter (ins.) | Wellbore Fluid Resistivity (ohm-m) | Layer Thickness (ins.) | Formation Resistivity (ohm-m) |
| --- | --- | --- | --- | --- |
| 1 | 8 | 0.01 | infinite | 100 |
| 2 | 10 | 0.01 | 2 | 100 |
| 3 | 8 | 0.01 | infinite | 100 |

Figure 4:
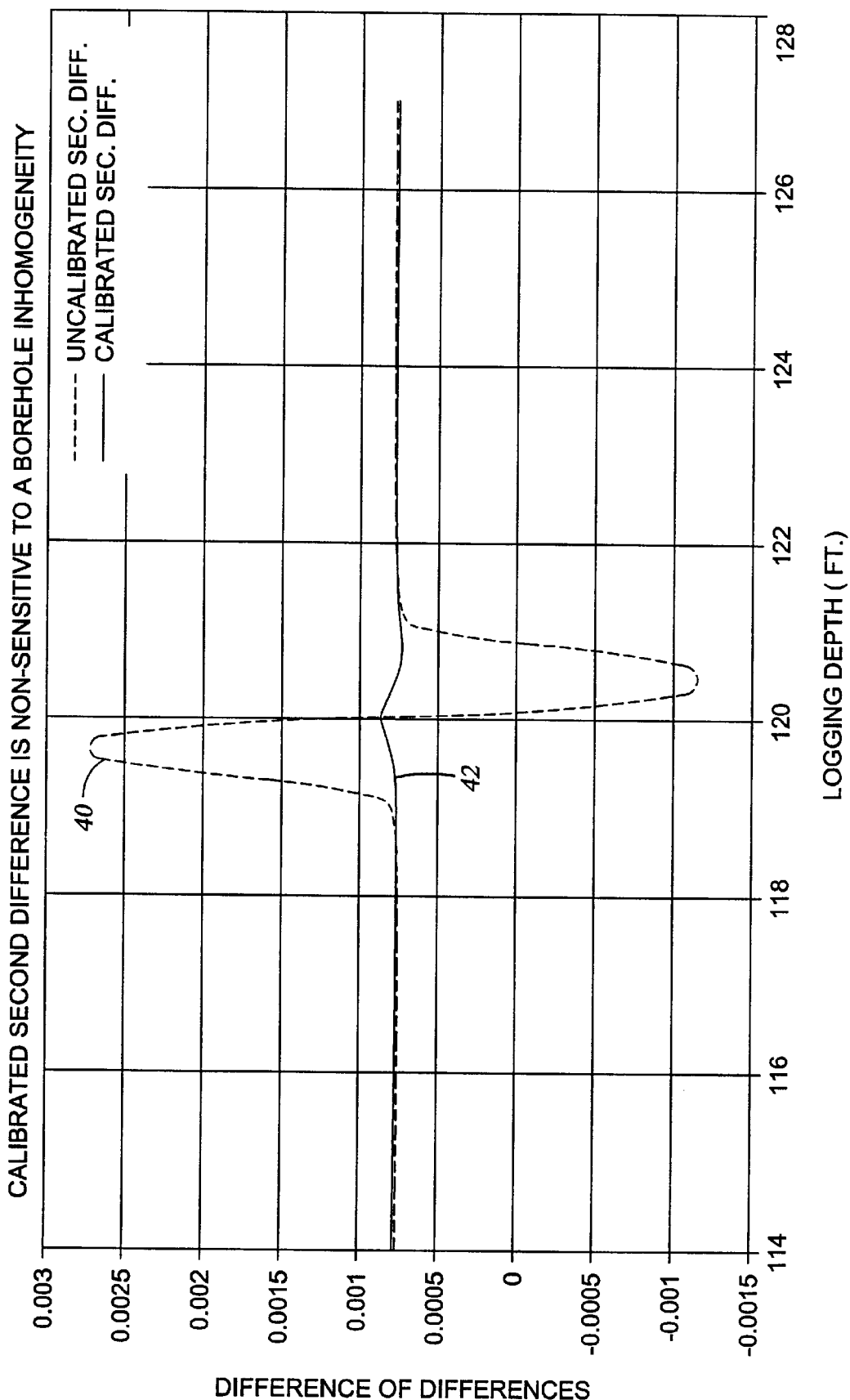
FIG. 4 shows a result of a numerical simulation of the method of the invention.

Results of the simulation can be observed in the graph of FIG. 4. In the results shown in FIG. 4, the "washout" was located approximately at the axial position represented by the logging depth of 120 feet. An "uncalibrated" difference of differences is shown by curve 40. A difference of differences using the calibration/measurement configurations is shown by curve 42. FIG. 4 shows that most of the effect of irregularity in the wall of the wellbore is removed from the difference of difference measurement by the method of the invention.

The method of the invention provides a measurement related to formation resistivity which is relatively unaffected by rugosity of the wall of the wellbore and drift in measuring circuits in the well logging instrument.

Those skilled in the art will devise other embodiments of the invention which do not depart from the spirit of the invention as disclosed herein. Accordingly, the invention should be limited in scope only by the attached claims.

What is claimed is:

1. A method for determining resistivity of earth formations penetrated by an uncased wellbore having irregularities in a wall thereof, the method comprising:

(a) imparting a first electrical current to said wellbore and earth formations from a first electrode disposed in said wellbore;

(b) returning said first electrical current at a second electrode in said wellbore at an axially spaced apart location from said first electrode;

(c) adjusting circuits used to measure voltage differences until a measured voltage difference between a first pair of electrodes located axially between said first and second electrodes is substantially the same as a measured voltage difference between a second pair of electrodes located axially between said first and second electrode wherein at least one of said voltage difference is in part dependent on said irregularities in the wellbore wall; and (d) after steps (a)–(c), imparting a second electrical current into the formation at the first electrode and returning said second electrical current to an electrode distal from said first electrode, repeating said steps of measuring said voltage differences and determining a difference of said voltage differences, whereby said difference of voltage difference represents a current leakage into said earth formation substantially unaffected by said irregularities, said current leakage related to said resistivity of said earth formations.

2. The method as defined in claim 1 further comprising inverting said difference of voltage differences to determine said resistivity of said earth formation.

3. The method as defined in claim 1 wherein said first and said second pairs of electrodes comprise three equally spaced electrodes disposed axially between said first and said second electrodes, and a spacing between said first electrode to a first outermost one of said first and second pairs of electrodes is substantially the same as a spacing between said second electrode and a second outermost one of said first and second pairs of electrodes.

4. A method for resistivity logging of earth formations penetrated by an uncased wellbore having irregularities in a wall thereof, the method comprising:

(a) inserting into said wellbore an insulated mandrel having a first and a second electrode disposed thereon at axially spaced apart locations and a first and a second pair of electrodes disposed on said mandrel between said first and said second electrodes;

(b) imparting a first electrical current to said wellbore and earth formations from said first electrode and returning said electrical current at said second electrode;

(c) adjusting circuits used to measure voltage differences until a measured voltage difference between said first pair is substantially the same as a measured difference between said second pair wherein at least one of said voltage differences is in part dependent on said irregularities in the wellbore wall; and (d) after steps (a)–(c), imparting a second electrical current into the formation at the first electrode and returning said second electrical current to an electrode distal from said first electrode, repeating said steps of measuring said voltage differences and determining a difference of said voltage differences, whereby said difference of voltage difference represents current leakage into said earth formation substantially unaffected by said irregularities or drift in said circuits, said current leakage related to said resistivity of said earth formations.

5. The method as defined in claim 4 further comprising inverting said difference of voltage differences to determine said resistivity of said earth formation.

6. The method as defined in claim 4 wherein said first and said second pairs of electrodes comprise three equally spaced electrodes disposed between said first and said second electrodes, and a spacing between said first electrode to a first outermost one of said first and second pairs of electrodes is substantially the same as a spacing between said second electrode and a second outermost one of said first and second pairs of electrodes.

7. The method of claim 1 wherein said difference of voltage differences is further unaffected by changes in the shape of the current path within the liquid in the vicinity of at least one of the electrodes, such changes being caused by said irregularities.

8. The method of claim 1 wherein said difference of voltage differences is further unaffected by drift in said circuits.

9. The method of claim 4 wherein said difference of voltage differences is further unaffected by changes in the shape of the current path within the liquid in the vicinity of at least one of the electrodes, such changes being caused by said irregularities.

10. The method of claim 4 wherein said difference of voltage differences is further unaffected by drift in said circuits.

* * * * *